Feb. 20, 1934.                    J. A. MAURER, JR                    1,947,565
                                    OPTICAL SYSTEM
                                  Filed April 6, 1931

INVENTOR
J. A. MAURER, JR.
BY
ATTORNEY

Patented Feb. 20, 1934

1,947,565

UNITED STATES PATENT OFFICE 1,947,565

OPTICAL SYSTEM

John A. Maurer, Jr., New York, N. Y., assignor to Radio Corporation of America, a corporation of Delaware Application April 6, 1931. Serial No. 528,096

4 Claims. (Cl. 88—24)

This invention relates to optical systems, and more particularly to such optical systems as are used in phonographic apparatus, particularly that of the photoelectric type, for producing a narrow linear image of either a primary or a secondary light source upon an image area such, for example, as the sound-track of a sound and picture film.

The present application pertains more particularly to such systems in which the dimensions of the final image are dependent upon the characteristics of the system rather than on the dimensions of the light-source or of a slit serving as a secondary source, and accordingly is related to applications 528,095, 528,097, 528,098 and 528,099, filed concurrently herewith and pertaining to collateral inventions of the same general kind. The present application, however, is characterized by the employment of a primary group of lenses having a sphero-cylindrical power and arranged to form a horizontal real image of the light-source reduced in its vertical dimension within such group of lenses.

One object of this invention is to produce such an optical system of reasonably high light efficiency and at the same time capable of producing an image of the necessary lateral attenuation.

Another object of this invention is to produce such a system which is capable of reasonable facility of manufacture.

Another object of this invention is to produce such a system which is capable of being manufactured at a reasonable cost under modern production methods.

Another object of this invention is to produce such a system which is adapted to reasonable facility and accuracy in installation.

Another object of this invention is to produce such a system which is adapted to or capable of using present commercially available lenses or lenses adapted to present commercial manufacture.

The light-source is indicated at "1".

The first or primary group of lenses is indicated at "2".

The objective or secondary group of lenses is indicated at "3".

The film or other image area is indicated at "4".

The cylindrical component of the objective is indicated at "5".

The objective diaphragm, where used, is indicated at "6'".

The first image of the source is indicated at "7".

The final functioning image is indicated at "8".

And a final virtual image is indicated at "8'".

Such other reference-numerals as may be common to two or more figures will be hereinafter more specifically pointed out.

The light in all cases is assumed to pass from left to right.

Figure 1:
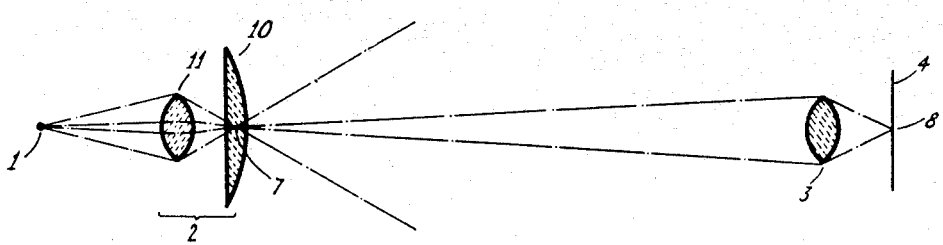
Figure 1 is a vertical section of a preferred form of the invention.
Figure 2:
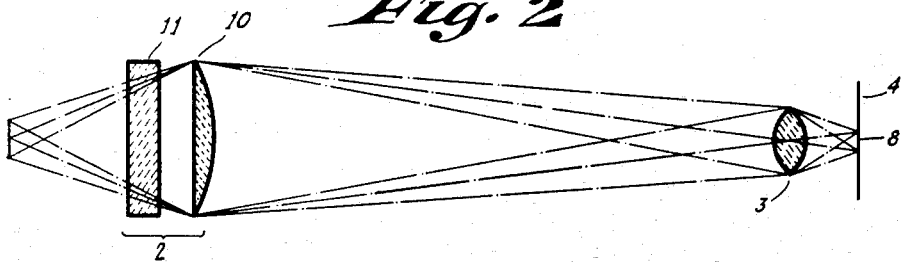
Figure 2 is a horizontal section corresponding to Figure 1.
Figure 3:
Figure 3 is a vertical section of a modification of Figure 1 employing an objective having a cylindrical component.
Figure 4:
Figure 4 is a horizontal section corresponding to Figure 3.

In the invention shown in Figures 1 and 2, and the modifications thereof in Figures 3 and 4:

The primary group 2 is composed of two lenses, a spherical lens 10 and a cylindrical lens 11. The spherical lens is of such power, as shown in Figure 2, that it alone would cast an image of the source 1 on the entrance-pupil of the objective 3.

In this as well as in the following modification, the source 1 is preferably in the form of a high-intensity lamp filament of the helical type, but it may obviously be of any other appropriate type, such as a small arc-lamp, a linear filament, a Nernst glower, etc.; or it may be a secondary source such as an illuminated aperture, or the reflector of a galvanometer or the equivalent as used in sound-recording apparatus or oscillographs. The objective 3 is shown as a double-convex spherical lens, but ordinarily would be of more complicated form, i. e., a microscope objective or the equivalent would be used. The cylindrical objective shown in Figures 3 and 4 may be constructed as shown, from a positive spherical lens and a positive cylindrical lens 5 of shorter focal length or it may be composed of a microscope objective provided with a cylindrical component, or it may be constructed as shown in my application Serial No. 523,284, filed March 17, 1931.

The positive cylindrical lens 11 is of such focal length that, in combination with the lens 10, it forms a linear image of the source at 7, and this image is smaller in its vertical dimension than the source in the same ratio as the distances of the source and the image from the principal planes of the lens combination. The lateral extent of this image, and thereby the length of the final image 8, is defined by the diameter of the lens 10.

The cylindrical lens 11 is so positioned that it produces the image 7 within the lens 10. This construction is particularly desirable in that the rays emerge from the lens 10 without any appreciable effect thereon by the lens 10 in the plane of operation of the lens 11. In other words, the width of the final image is determined without consideration of any magnifying power of the lens 10, which might otherwise tend to increase the width of the final linear image, and at the same time the lens 10 is permitted to function as a condenser lens along the plane of the axis of the lens 11 without any interference with such function by the lens 11 other than the limitation of aperture in the vertical direction which necessarily follows from the restricted size of the lens 11.

The objective 3 is so positioned that it focuses an image of the line 7 upon the film or other image area 4 at 8.

In the form shown in Figures 3 and 4, the objective likewise forms a sharp image 8 in the vertical plane, but in the horizontal plane, due to the astigmatic nature of the objective, there is a tendency to form an image at 8' and the ends of the linear image would therefore not be sharply defined. I accordingly place a diaphragm 6' between this lens and the image-area to cut off the marginal rays of less intensity and limit the image to the desired dimension.

It will be understood that in this specification, the terms "horizontal" and "vertical" have not been used in any absolute sense of the term but merely as indicating relative position or direction, and that choice between these terms has been determined merely by convenience in illustration.

I claim:

1. A linear-image-forming optical system comprising a plurality of lens components, one of said lens components including a positive lens element approximately imaging a light source upon the entrance-pupil of another of said lens components and a positive cylindrical lens element forming a linear image of the light source within said positive lens element, the other of said lens components being of positive power and located with the said linear image at a focus thereof, whereby it will form an image of said linear image on an image area at the other of its conjugate foci.

2. A linear-image-forming optical system comprising a plurality of lens components, one of said lens components including a positive lens element approximately imaging a light source upon the entrance-pupil of another of said lens components and a positive cylindrical lens element forming a linear image of the light source within said positive lens element, the other of said lens components having positive cylindrical power and being located with the said linear image at a focus thereof, whereby it will form a linear image of said linear image on an image area at the other of its conjugate foci.

3. A linear-image-forming optical system comprising a plurality of lens components, one of said lens components including a positive lens element approximately imaging a light source upon the entrance-pupil of another of said lens components and another positive cylindrical lens element forming a linear image of the light source narrower than the light source within said positive lens element, the other of said lens components being of positive power and located with the said linear image at a focus thereof, whereby it will form an image of said linear image on an image area at the other of its conjugate foci.

4. A linear-image-forming optical system comprising a plurality of lens components, one of said lens components including a positive lens element approximately imaging a light source upon the entrance-pupil of another of said lens components and a positive cylindrical lens element forming a linear image of the light source narrower than the light source within said positive lens element, the other of said lens components having positive cylindrical power and being located with the said linear image at a focus thereof, whereby it will form a linear image of said linear image on an image area at the other of its conjugate foci.

JOHN A. MAURER, Jr.